United States Patent [19]

Olsen

[11] 4,210,890
[45] Jul. 1, 1980

[54] FIELD ASSEMBLY FOR AN ELECTROMAGNET

[75] Inventor: Robert A. Olsen, Janesville, Wis.

[73] Assignee: Warner Electric Brake & Clutch Company, South Beloit, Ill.

[21] Appl. No.: 946,114

[22] Filed: Sep. 27, 1978

[51] Int. Cl.² ............................ H01F 3/00; H01F 7/08
[52] U.S. Cl. ....................................... 335/281; 310/42; 335/282; 336/65
[58] Field of Search .............. 335/278, 281, 282, 296, 335/297; 336/65, 90; 310/42, 218

[56] References Cited

U.S. PATENT DOCUMENTS

| 2,395,905 | 3/1946 | Oetzel | 188/164 X |
|---|---|---|---|
| 2,507,573 | 5/1950 | Oetzel | 335/296 |
| 3,036,246 | 5/1962 | Valleau | 335/297 |
| 3,753,182 | 8/1973 | Grove | 335/281 |
| 3,995,244 | 11/1976 | Sayo | 335/296 |
| 4,088,910 | 5/1978 | Frey | 310/42 X |
| 4,105,985 | 8/1978 | Plunkett | 336/90 |
| 4,135,106 | 1/1979 | Jollois | 336/65 X |

Primary Examiner—Fred L. Braun
Attorney, Agent, or Firm—Leydig, Voit, Osann, Mayer & Holt, Ltd.

[57] ABSTRACT

The field shell of an electromagnet is formed with angularly spaced flanges which define a magnetic pole and which also serve as a mounting hub for a coil assembly consisting of a bobbin and a multiple turn winding. Resilient fingers on the bobbin snap into openings in the flanges to hold the bobbin and the shell in assembled relationship. Tabs are located between and project inwardly from the flanges and are used to mount the shell in a fixed position.

9 Claims, 5 Drawing Figures

FIELD ASSEMBLY FOR AN ELECTROMAGNET

BACKGROUND OF THE INVENTION

This invention relates to a field assembly for an electromagnet of the type which may be used, for example, in an electric clutch or brake. Such a field assembly customarily comprises a shell having two radially spaced and ring-like flanges which define the inner and outer magnetic poles of the field assembly. The inner flange also serves as a mounting hub for a coil assembly. The latter often comprises an annular bobbin which supports a multiple turn winding.

In a field assembly of the foregoing type, the bobbin of the coil assembly is telescoped over the mounting hub of the shell and then is secured to the shell. It has been common practice in the art to secure the bobbin to the shell by a suitable cement such as epoxy. A field assembly of this general character is disclosed in Grove U.S. Pat. No. 3,753,182.

SUMMARY OF THE INVENTION

The general aim of the present invention is to provide a new and improved field assembly in which the shell and the bobbin are uniquely constructed so as to simplify the manner in which the bobbin is assembled with the shell and also to reduce the cost and weight of the shell.

Another object is to provide a field assembly in which the bobbin, while being held securely in the shell, can be removed from the shell and replaced if the winding fails.

A more detailed object is to achieve the foregoing by providing a field assembly in which the shell and the bobbin are adapted to interlock with one another with a snap action when the two are telescoped together, the shell preferably being blanked and bent from sheet metal and being formed with unique tabs for mounting the shell in a stationary position.

The invention also resides in the provision of a unique bobbin having resiliently yieldable fingers adapted to snap into openings in the mounting hub of the shell in order to hold the bobbin and the shell in assembled relationship.

These and other objects and advantages of the invention will become more apparent from the following detailed description when taken in conjunction with the accompanying drawings.

DETAILED DESCRIPTION OF THE PREFERRED EMBODIMENT

Figure 1:
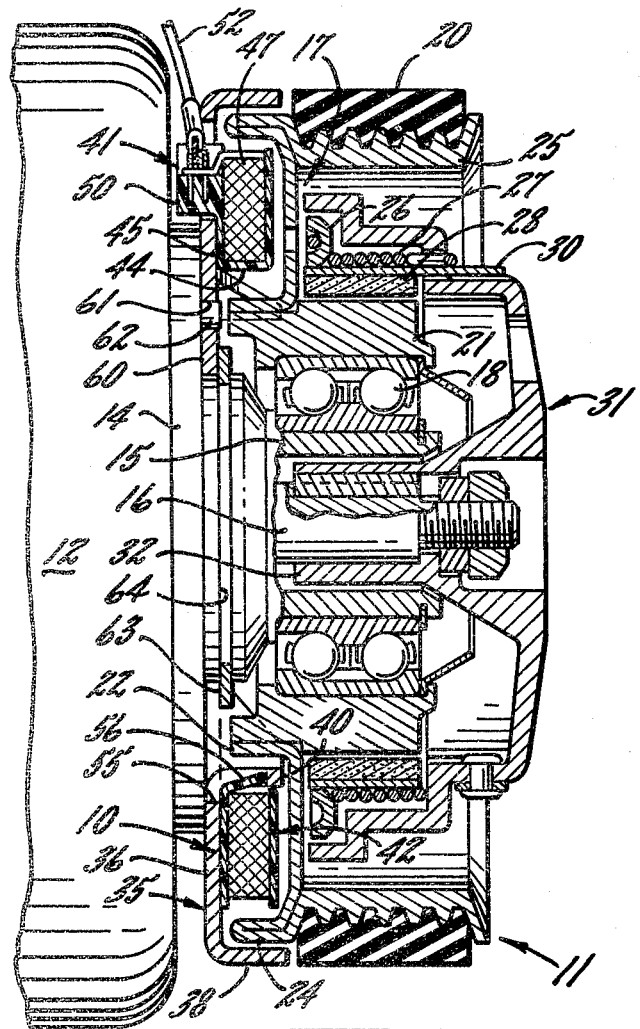
FIG. 1 is a substantially diametrical sectional view of an exemplary electromagnetic clutch equipped with a new and improved field assembly incorporating the unique features of the present invention.

For purposes of illustration, the field assembly 10 of the present invention is shown in the drawings in conjunction with an electromagnetic friction clutch 11 adapted to be used in conjunction with an automobile air conditioning compressor 12. The latter includes a mounting plate 14 and a tubular nose 15 for supporting the clutch and further includes a drive shaft 16 which extends rotatably through the nose.

An input member in the form of an annular rotor 17 is rotatably journaled on the nose 15 of the compressor 12 by a ball bearing 18 and is adapted to be driven from the engine of the vehicle by an endless belt 20. The rotor 17 comprises a tubular hub 21 which is fastened to the outer race of the bearing 18. Secured rigidly to the rear end portion of the hub 21 is an inner pole ring 22 made of magnetic material. An outer pole ring 24 is formed integrally with and is isolated magnetically from the inner pole ring 22. A grooved pulley 25 is formed integrally with the outer pole ring 24 and is adapted to receive the endless belt 20. When the latter is driven, the pulley 25, the pole rings 22 and 24 and the hub 21 all rotate around the bearing 18.

An armature 26 is disposed in opposing relation with pole faces defined by the forward ends of the pole rings 22 and 24 of the rotor 17. When the field assembly 10 is excited, magnetic flux attracts the armature 26 into engagement with the pole faces to cause the armature to turn with the rotor 17. Turning of the armature 26 causes a helically coiled spring 27 to contract a shoe 28 into gripping engagement with the hub 21. The shoe is connected by leaf springs 30 to an output member 31 having a sleeve 32 telescoped into the compressor nose 15 and keyed to the compressor drive shaft 16.

As described thus far, the clutch 11 is identical to that disclosed in MacDonald United States application Ser. No. 908,354, filed May 22, 1978 and assigned to the assignee of the present invention. Reference may be had to the MacDonald application for a more detailed disclosure of the construction and operation of a clutch of this general type.

The field assembly 10 includes a one-piece shell 35 (FIGS. 2 and 3) made of sheet metal and adapted to be secured to the mounting plate 14 and nose 15 of the compressor 12. In this instance, the shell is defined by a flat disc 36 disposed in a radially extending plane and formed with a centrally located and generally circular hole 37 for receiving the nose 15 of the compressor 12 with substantial clearance. Formed around the outer peripheral margin of the disc 36 is an axially extending flange 38 which defines an outer pole ring and which is located outwardly of and in radially overlapping relation with the outer pole ring 24 of the rotor 17.

Axially projecting flange means 40 (FIGS. 2 and 3) are formed integrally with the disc 36 and extend around the hole 37 of the disc adjacent the margins thereof. The flange means 40 define an inner pole ring which is disposed outwardly of and in radially overlapping relation with the inner pole ring 22 of the rotor 17. In addition, the flange means 40 define a mounting hub for a coil assembly 41 (FIGS. 2 and 4) which forms part of the field assembly 10.

The coil assembly 41 includes an annular bobbin 42 molded from a suitable plastic and formed with a generally U-shaped radial cross-section. Thus, the bobbin comprises an inner annulus 44 extending in an axial direction and located at the inner margins of two axially spaced and radially extending rings 45 and 46, the annulus and the two rings coacting to define a channel. Cemented within such channel is a multiple turn coil or winding 47 having lead wires 48 connected to a terminal block 50 formed integrally with and projecting rearwardly from the rear ring 45 of the bobbin 42.

In the assembled clutch 11, the bobbin 42 of the coil assembly 41 is telescoped over the mounting hub defined by the flange means 40 of the shell 35 and is located with its rear ring 45 abutting the disc 36 of the shell and with its terminal block 50 projecting through a rectangular hole 51 (FIGS. 2 and 3) in the disc. Lead wires 52 (FIG. 1) are connected between the terminal block 50 and a voltage source (not shown) and, when the winding 47 is excited by the voltage source, magnetic flux threads through the pole rings 38 and 40 of the field assembly 10 and the pole rings 22 and 24 of the rotor 17 to attract the armature 26 into engagement with the pole faces defined by the pole rings 22 and 24. The nature of the controlled flux transfer between the various pole rings and the armature is disclosed in detail in the aforementioned MacDonald application and is disclosed in even more detail in Newton et al United States application Ser. No. 860,582, filed Dec. 14, 1977, now U.S. Pat. No. 4,160,498, and assigned to the assignee of the present invention.

In its primary aspect, the present invention contemplates constructing the shell 35 and the bobbin 42 of the field assembly 10 in a unique manner to enable the bobbin to be more easily and economically assembled with the shell and to enable the bobbin to be easily removed from the shell in the event the winding 47 burns out or otherwise fails. This is achieved by constructing the shell 35 and the bobbin 42 such that the two automatically interlock with one another with a snap action when the bobbin is telescoped over the mounting hub defined by the flange means 40 of the shell. As a result of the automatic interlocking, no cement or the like is required to hold the shell and the bobbin in assembled relationship and, in addition, the bobbin may be disassembled from the shell and replaced with a bobbin having a new winding.

More specifically, the shell 35 and the bobbin 42 herein are formed with coacting means 55 and 56, respectively, which automatically interlock as an incident to the bobbin being telescoped onto the mounting hub defined by the flange means 40 of the shell. In the present instance, the means 55 comprise three generally rectangular openings (FIGS. 2 and 3) spaced angularly around the flange means 40 and extending radially through the flange means. The openings 55 terminate short of the forward edge portions of the flange means and continue a short distance into the disc 36 of the shell 35.

Figure 2:
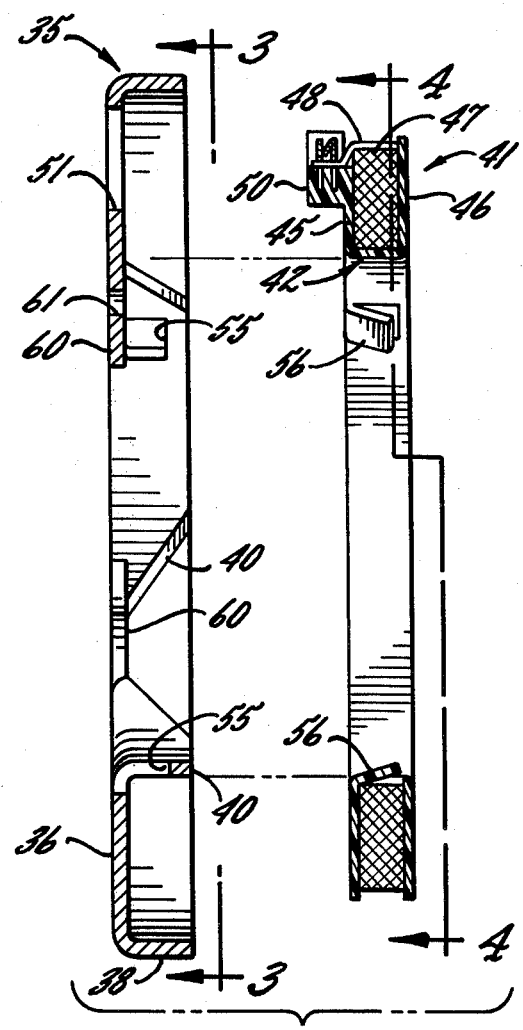
FIG. 2 is an exploded view showing the shell and coil assembly of the field assembly in substantially diametrical cross-section.

The means 56 on the bobbin 42 are defined by three resiliently yieldable fingers (FIGS. 2 and 4) which are molded integrally with and which extend angularly around the inner annulus 44 of the bobbin. As shown in FIG. 2, each finger 56 is struck inwardly from the annulus 44 and is hinged or cantilevered at the junction of the annulus with the rear ring 45 of the bobbin. The fingers 56 are inclined such that they converge toward one another as they progress inwardly in a radial direction and as they progress forwardly in an axial direction.

To assemble the bobbin 42 with the shell 35, it is necessary only to slip the annulus 44 of the bobbin onto the flange means 40 of the shell and to slide the bobbin rearwardly. As the fingers 56 encounter the forward edge portions of the flange means 40, they are cammed outwardly to allow continued rearward movement of the bobbin. Then, when the fingers 56 pass into registry with the openings 55, they spring inwardly and enter into the openings. In the finally assembled position of the bobbin, the forward edges of the fingers 56 engage the forward edges of the openings 55 (see FIG. 1) and prevent the bobbin from moving forwardly on the flange means 40. Rearward movement of the bobbin is prevented, of course, by engagement of the rear ring 45 of the bobbin with the disc 36 of the shell while angular movement of the bobbin is prevented by the fingers 56 and the terminal block 50. With the bobbin 42 being held radially by the flange means 40, the bobbin is locked to the shell 35 in all directions and will not move relative to the shell when the field assembly 10 is subjected to shock or vibration.

From the foregoing, it will be apparent that assembly of the shell 35 and the bobbin 42 is an extremely simple operation. If it becomes necessary to disassemble the bobbin and the shell, the fingers 56 can be manually deflected outwardly until their forward edges clear the forward edges of the openings 55. The bobbin then can be slid forwardly off of the flange means 40. Accordingly, a clutch having a defective or burned out winding can be repaired simply by replacing the coil assembly 41 rather than replacing the entire field assembly 10.

In accordance with another aspect of the invention, the shell 35 is constructed so that it can be manufactured by a simple blanking and bending process rather than by a deep drawing operation. In addition, the shell is constructed so as to avoid the need of using a conventional and relatively heavy adaptor plate to mount the shell on the compressor 12.

Figure 3:
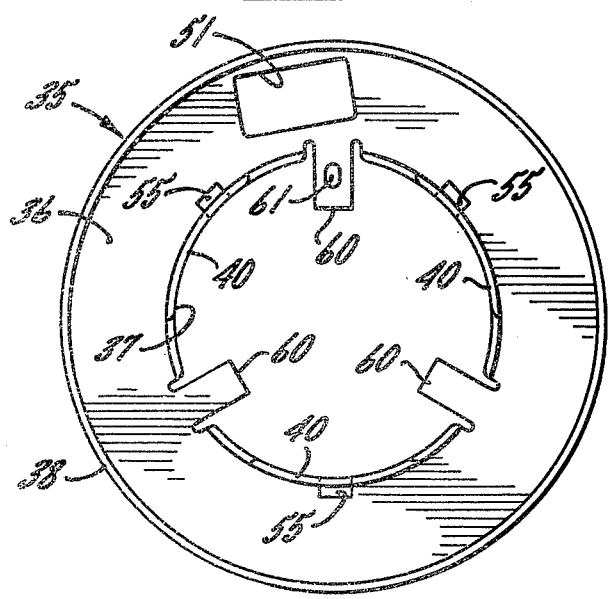
FIG. 3 is a view of the shell on a reduced scale as taken along the line 3—3 of FIG. 2.
Figure 4:
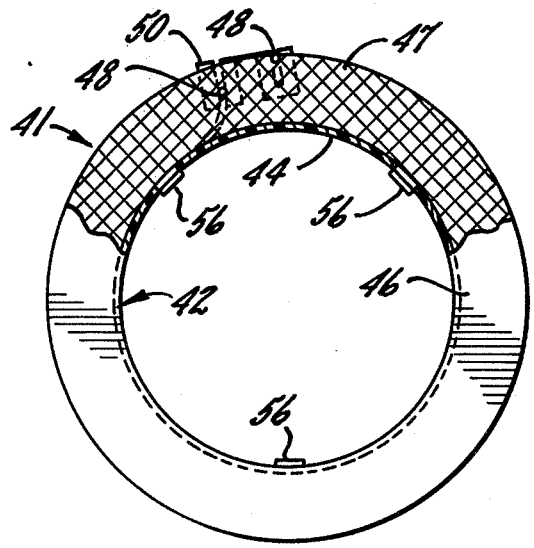
FIG. 4 is a view of the coil assembly on a reduced scale as taken substantially along the line 4—4 of FIG. 2.

To achieve the foregoing, the flange means 40, rather than being a single, continuous annular flange, are formed by three angularly spaced and generally arcuate flanges as shown in FIG. 3. Disposed between the flanges 40 are three mounting tabs 60 which project radially inwardly from the flanges and which are disposed in the same plane as the disc 36 of the shell 35. A hole 61 is formed through one of the tabs. When the shell is mounted on the compressor 12, the hole 61 receives a locating pin 62 (FIG. 1) which projects forwardly from the mounting plate 14 of the compressor and thus the shell 35 is prevented from turning angularly. The inner ends of the tabs 60 engage the nose 15 of the compressor to locate the shell in a radial direction while a snap ring 63 engages the forward sides of the tabs and fits into a groove 64 around the nose to captivate the shell in an axial direction. Accordingly, the tabs 60 enable the field assembly 10 to be mounted to the compressor in a very simple manner and without need of an adaptor plate.

Figure 5:
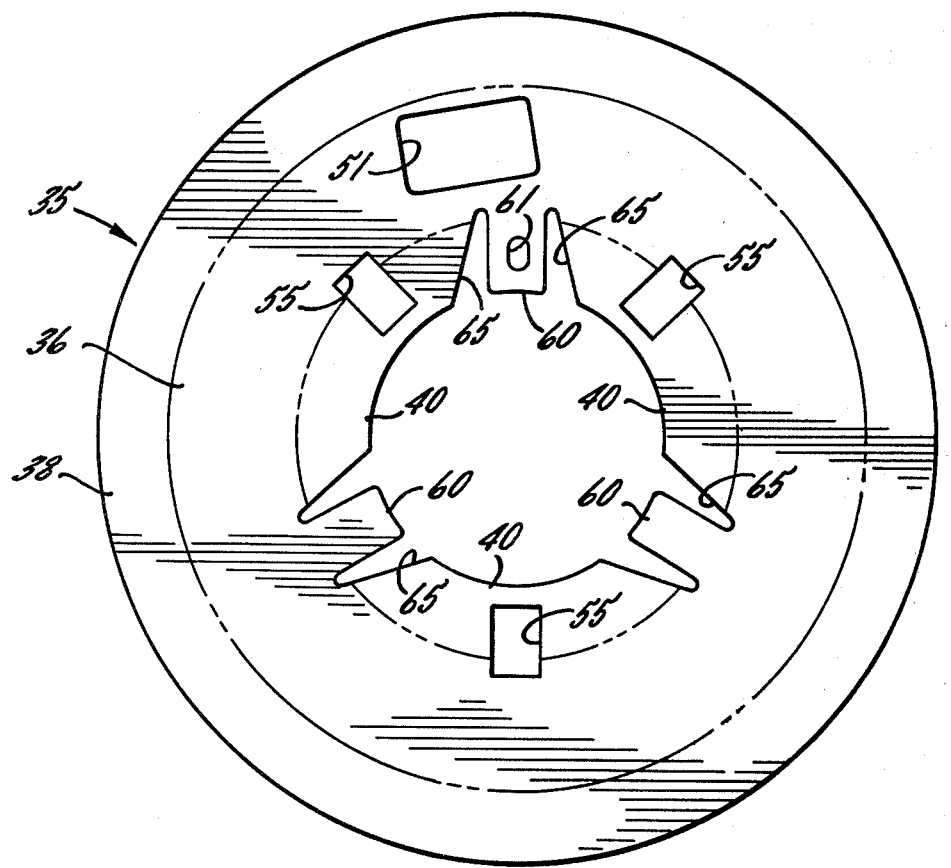
FIG. 5 is a developed view of the shell as initially blanked from sheet metal but before being bent into its final form.

A developed view of the shell 35 is shown in FIG. 5 and illustrates the shell after the latter has been stamped from a sheet of metal but before any bending operation has taken place. As illustrated, the openings 55 extend into the disc 36 of the shell as well as through the flanges 40. In addition, each flange 40 is separated from its adjacent mounting tab 60 by notches 65 which taper as they progress radially outwardly. With this arrangement, the shell may be formed by a simple blanking and bending operation and need not be blanked and deep drawn.

I claim:

1. A field assembly for an electromagnet, said field assembly comprising a single-piece shell, said shell including a disc having a hole through the center thereof, arcuate flange means projecting axially from said disc and extending around said hole adjacent the margins thereof, said flange means defining a magnetic pole and also defining a mounting hub, said field assembly further comprising a coil assembly defined by an annular bobbin and by a multiple turn winding supported by said bobbin, said bobbin having an inner annulus telescoped over said mounting hub, said field assembly being characterized in that said shell and said bobbin are formed with coacting means which interlock with one another with a snap action when the annulus of said bobbin is telescoped over the mounting hub of said shell and is moved axially in one direction to a predetermined position on said hub, said coacting means being operable, when interlocked, to prevent axial movement of said bobbin in the opposite direction along said hub and thereby serving to prevent said bobbin from being separated axially from said shell.

2. A field assembly as defined in claim 1 in which said coacting means include a plurality of angularly spaced openings formed in said shell, said coacting means further comprising a plurality of angularly spaced and resiliently yieldable fingers projecting from said bobbin and adapted to snap into said openings when the annulus of said bobbin is telescoped onto the mounting hub of said shell.

3. A field assembly defined in claim 2 in which said openings are formed in and extend radially through said mounting hub, said fingers projecting inwardly from the annulus of said bobbin.

4. A field assembly as defined in claim 3 in which said fingers are cantilevered relative to said annulus and are inclined so as to converge toward one another.

5. A field assembly as defined in either of claims 1, 2, 3 or 4 in which said flange means comprise a plurality of angularly spaced flanges, said shell further comprising a plurality of mounting tabs disposed in substantially the same place as said disc, said mounting tabs being located between said flanges and extending radially inwardly therefrom.

6. A field assembly for an electromagnet, said field assembly comprising a single-piece shell, said shell including a disc having a generally circular hole through the center thereof, a flange projecting axially from said disc around the outer periphery thereof and defining a first magnetic pole, arcuate flange means projecting axially from said disc and extending around said hole adjacent the margins thereof, said flange means defining a second magnetic pole and also defining a mounting hub, said field assembly further comprising a coil assembly defined by an annular bobbin and by a multiple turn winding supported by said bobbin, said bobbin having an inner annulus telescoped over said mounting hub, said field assembly being characterized in that a plurality of angularly spaced openings are formed in and extend radially through said mounting hub, and a plurality of angularly spaced and resiliently yieldable fingers formed integrally with and projecting inwardly from the annulus of said bobbin and adapted to snap into said openings when the annulus of said bobbin is telescoped onto the mounting hub of said shell, said fingers and said openings coacting to hold said bobbin in assembled relationship with said shell.

7. A field assembly as defined in claim 6 in which said flange means comprise a plurality of angularly spaced flanges, said shell further comprising a plurality of mounting tabs disposed in substantially the same plane as said disc, said mounting tabs being located between said angularly spaced flanges and extending radially inwardly therefrom.

8. A field assembly for an electromagnet and comprising a single-piece shell made from sheet metal, said shell including a disc having a generally circular hole through the center thereof, arcuate flange means projecting axially from said disc and extending around said hole adjacent the margins thereof, said flange means defining a magnetic pole and also defining a mounting hub, and an annular coil assembly telescoped onto said mounting hub, said field assembly being characterized in that said flange means comprise a plurality of angularly spaced flanges, said shell further comprising a plurality of mounting tabs disposed in substantially the same plane as said disc, said mounting tabs being located between said angularly spaced flanges and extending radially inwardly therefrom.

9. A field assembly as defined in claim 8 in which a plurality of openings are formed in and extend radially through said flanges, said openings also extending axially through said disc, and a plurality of resiliently yieldable fingers on said coil assembly and adapted to interlock with the openings in said flanges with a snap action.

* * * * *